(12) United States Patent
Akimoto et al.

(10) Patent No.: US 11,385,825 B2
(45) Date of Patent: Jul. 12, 2022

(54) COMPUTER APPARATUS, COMPUTER SYSTEM, AND DATA MIGRATION METHOD

(71) Applicant: Hitachi, Ltd., Tokyo (JP)

(72) Inventors: Yoshihito Akimoto, Tokyo (JP); Yuki Koizumi, Tokyo (JP); Hiroshi Suzuki, Tokyo (JP); Chieko Akiba, Tokyo (JP)

(73) Assignee: HITACHI, LTD., Tokyo (JP)

( * ) Notice: Subject to any disclaimer, the term of this patent is extended or adjusted under 35 U.S.C. 154(b) by 0 days.

(21) Appl. No.: 17/203,426

(22) Filed: Mar. 16, 2021

(65) Prior Publication Data

US 2021/0349652 A1    Nov. 11, 2021

(51) Int. Cl.
*G06F 3/06* (2006.01)

(52) U.S. Cl.
CPC ............ *G06F 3/0647* (2013.01); *G06F 3/067* (2013.01); *G06F 3/0614* (2013.01); *G06F 3/0659* (2013.01)

(58) Field of Classification Search
CPC .................................................. G06F 3/0647
See application file for complete search history.

(56) References Cited

U.S. PATENT DOCUMENTS

| 5,568,628 | A | * | 10/1996 | Satoh | .................. G06F 12/0866 711/119 |
| 2002/0083043 | A1 | * | 6/2002 | Hoshi | ................. G06F 16/9535 |
| 2003/0191916 | A1 | * | 10/2003 | McBrearty | .......... G06F 11/1464 711/112 |

FOREIGN PATENT DOCUMENTS

WO     2017/072978 A1    5/2017

\* cited by examiner

*Primary Examiner* — Jae U Yu
(74) *Attorney, Agent, or Firm* — Procopio, Cory, Hargreaves & Savitch LLP

(57) ABSTRACT

A computer system includes a use state analysis program that acquires a use history of data in a first computer system and a program that uses the data; and a data migration program that extracts data that is able to be migrated from the first computer system to a second computer system on the basis of the use history, writes the migratable data to a first storage system and a second storage system, and migrates a program to the second computer system on the basis of a use history of the data used by the program.

8 Claims, 13 Drawing Sheets

FIG. 2

Dataset history table 131

| Dataset name | Volume name | Job name | Step name | Program name | Input /output | DS state | Data amount | Date and time |
|---|---|---|---|---|---|---|---|---|
| DATA1 | VOL001 | JOB01 | STEP1 | PGM1 | Input | OLD | 100 | 10/01 00:10 |
| DATA3 | VOL001 | JOB01 | STEP1 | PGM1 | Output | MOD | 70 | 10/01 00:10 |
| DATA2 | VOL001 | JOB01 | STEP2 | PGM2 | Input | OLD | 200 | 10/01 00:11 |
| DATA3 | VOL001 | JOB01 | STEP2 | PGM2 | Output | MOD | 80 | 10/01 00:11 |
| DATA3 | VOL001 | JOB02 | STEP1 | PGM3 | Input | OLD | 150 | 10/01 00:12 |
| DATAW | VOL001 | JOB02 | STEP1 | PGM3 | Output | RNW | 10 | 10/01 00:12 |
| DATA4 | VOL001 | JOB02 | STEP2 | PGM4 | Output | NEW | 500 | 10/01 00:13 |
| DATAW | VOL001 | JOB02 | STEP2 | PGM4 | Input | OLD | 10 | 10/01 00:14 |
| DATA2 | VOL001 | JOB03 | STEP1 | PGM5 | Input | OLD | 200 | 10/01 00:20 |
| DATA3 | VOL001 | JOB03 | STEP1 | PGM5 | Input | OLD | 150 | 10/01 00:20 |
| DATA5 | VOL001 | JOB03 | STEP1 | PGM5 | Output | NEW | 300 | 10/01 00:21 |
| 131a | 131b | 131c | 131d | 131e | 131f | 131g | 131h | 131i |

FIG. 3

Job step input/output information table  132

| Job name | Step name | Dataset name | Volume name |
|---|---|---|---|
| JOB01 | STEP1 | DATA1 | VOL001 |
| JOB01 | STEP1 | DATA3 | VOL001 |
| JOB01 | STEP2 | DATA2 | VOL001 |
| JOB01 | STEP2 | DATA3 | VOL001 |
| JOB02 | STEP1 | DATA3 | VOL001 |
| JOB02 | STEP1 | DATAW | VOL001 |
| JOB02 | STEP2 | DATA4 | VOL001 |
| JOB02 | STEP2 | DATAW | VOL001 |
| JOB03 | STEP1 | DATA2 | VOL001 |
| JOB03 | STEP1 | DATA3 | VOL001 |
| JOB03 | STEP1 | DATA5 | VOL001 |

Dataset usage management table  133

| Dataset name | Volume name | Reference to individual dataset usage management table |
|---|---|---|
| DATA1 | VOL001 | DATA1_VOL001_TABLE |
| DATA2 | VOL001 | DATA2_VOL001_TABLE |
| DATA3 | VOL001 | DATA3_VOL001_TABLE |
| DATA4 | VOL001 | DATA4_VOL001_TABLE |
| DATA5 | VOL001 | DATA5_VOL001_TABLE |
| DATAW | VOL002 | DATAW_VOL001_TABLE |

Individual dataset usage management table
(DATA3_VOL001_TABLE)    134

| Access order | Job name | Step name | Input /output | Migration verification flag | Migration completion flag |
|---|---|---|---|---|---|
| 1 | JOB01 | STEP1 | Output | OFF | OFF |
| 2 | JOB01 | STEP2 | Output | OFF | OFF |
| 3 | JOB02 | STEP2 | Input | OFF | OFF |
| 4 | JOB03 | STEP3 | Input | OFF | OFF |

134a    134b    134c    134d    134e    134f

COMPUTER APPARATUS, COMPUTER SYSTEM, AND DATA MIGRATION METHOD

CROSS-REFERENCE TO PRIOR APPLICATION

This application relates to and claim the benefit of priority from Japanese Patent Application No. 2020-83115 filed on May 11, 2020 the entire disclosure of which is incorporated herein by reference.

BACKGROUND

The present invention relates to a computer apparatus, a computer system, and a control method.

The present invention is suitable, for example, for the migration of operations from a mainframe to an open system.

A mainframe is a large-scale computer system used for a core operation system of a company or the like. Many hardware and software components used are designed exclusively for mainframes, and although the mainframes have high reliability and processing power, the mainframes have the disadvantage of requiring a reasonable maintenance cost.

On the other hand, an open system is a computer apparatus constructed by combining general-purpose hardware and software components, and has the advantage that it can be introduced and operated at a low cost, although its reliability and processing power are lower than those of a mainframe. For this reason, in recent years, an increasing number of companies are replacing mainframes with open systems for computers used in computer systems for the purpose of cost reduction.

In such a computer replacement operation, it is necessary to migrate various operations performed on the mainframe to an open system. In general, such an operation of migrating an operation from a mainframe to an open system is performed such that all programs for executing the operation are modified to the format corresponding to the open system and are ported to the open system, and the operation on the mainframe side is temporarily stopped, and the operation is resumed on the open system side.

As a background technology in this technical field, there is WO 2017/072978 (Patent Literature 1) is known. This publication discloses a technology in which a batch operation is divided into program units that execute job steps, and the processes of the job steps are automatically and sequentially migrated to the open system in order from the job step corresponding to the program that has been ported to the open system and verified.

Data storage formats and character codes are different between mainframes and open systems, so they cannot be used as they are. In migration, it is necessary to consider not only job and program migration but also data migration.

In conventional technologies, storages accessible from both mainframes and open systems are used, and data migration is not automated.

Since the storage is accessed from both the mainframe and the open system, the input/output overhead due to data conversion is large.

The present invention has been made in view of the problems, and an object thereof is to provide a computer apparatus, a computer system, and a data migration method capable of automating data migration required for migration.

SUMMARY

In order to solve the problem, a computer apparatus according to an aspect of the present invention is a computer apparatus that migrates operations having programs and data from a computer system having the computer apparatus and a storage apparatus to a migration destination computer system which has a system environment different from that of the computer system and has a migration destination computer apparatus and a migration destination storage apparatus, the computer apparatus including: a use state analysis unit configured to acquire a use history of the data in the computer system and the program using the data; and a data migration unit configured to extract the data that is able to be migrated from the computer system to the migration destination computer system on the basis of the use history, write the migratable data to the storage apparatus and the migration destination storage apparatus, and migrate the program to the migration destination computer system on the basis of the use history of the data used by the program.

According to the present invention, it is possible to realize a computer apparatus, a computer system, and a data migration method capable of automating data migration required for migration.

BRIEF DESCRIPTION OF THE DRAWINGS

FIG. 2 is a diagram illustrating a dataset history table of the computer system according to the embodiment, FIG. 3 is a diagram illustrating a job step input/output information table of the computer system according to the embodiment, FIG. 4 is a diagram illustrating a dataset usage management table of the computer system according to the embodiment, FIG. 5 is a diagram illustrating an individual dataset usage management table of the computer system according to the embodiment.

DETAILED DESCRIPTION OF THE EMBODIMENT

Figure 1:
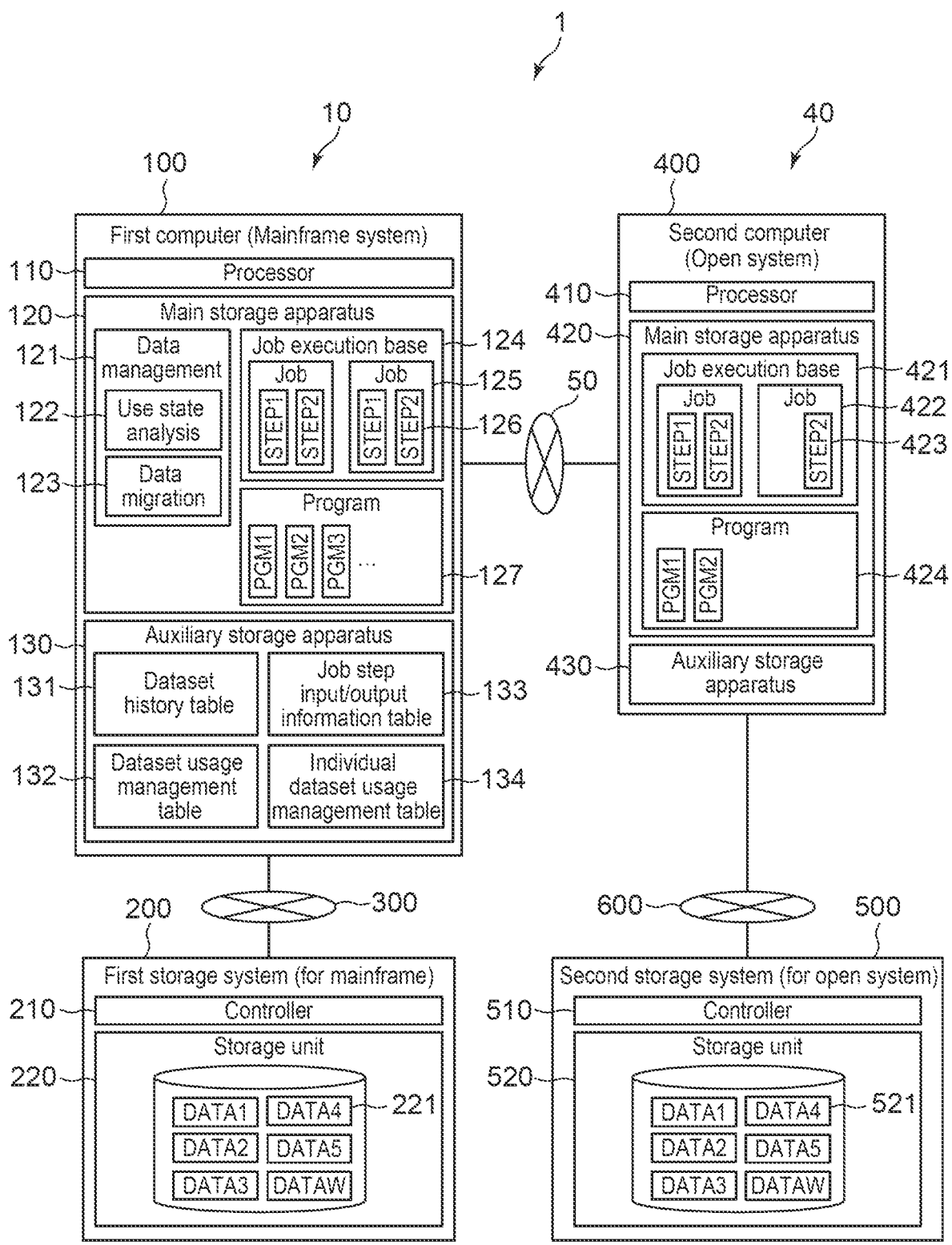
FIG. 1 is a diagram illustrating a hardware configuration of a computer system according to an embodiment.

Hereinafter, an embodiment of the present invention will be described with reference to the drawings. The following descriptions and drawings are examples for explaining the present invention, and omissions and simplifications will be made appropriately for the sake of clear explanation. The present invention may be implemented in various other embodiments. The respective components may be provided plurals or solely unless particularly stated otherwise.

In the drawings for explaining the embodiment, components having the same function are denoted by the same reference numerals, and the repeated description thereof will be omitted.

The position, size, shape, range, and the like of each component illustrated in the drawings may not represent the actual position, size, shape, range, and the like, in order to facilitate understanding of the invention. Therefore, the present invention is not necessarily limited to the position, size, shape, range and the like disclosed in the drawings.

In the following description, although various items of information are sometimes described using an expression such as "table", "list", or "queue", the respective items of information may be expressed by any data structure other than these expressions. That is, the "XX table", "XX list", and the like can be referred to as "XX information" to show that the respective items of information do not depend on the data structure. Although an expression such as "identification information", "identifier", "name", "ID", or "number", is used when describing identification information, these expressions can be replaced with each other.

Moreover, in the following description, the configuration of each table is an example, one table may be divided into two or more tables, and all or a portion of two or more tables may be integrated into one table.

When there is a plurality of components having the same or similar functions, they may be described by adding different subscripts to the same reference numerals. However, when it is not necessary to distinguish between the plurality of components, the subscripts may be omitted for explanation.

Further, in the following description, a process to be performed by executing a program may be described. However, the program is executed by a processor (for example, a CPU or a GPU) so that a predetermined process is performed while appropriately using a storage resource (for example, memory) and/or an interface device (for example, a communication port). Therefore, the subject of the process may be the processor. Similarly, the subject of the process performed by executing the program may be a controller, an apparatus, a system, a computer, or a node, which have a processor. The subject of the process performed by executing the program may be an arithmetic unit, and may include a dedicated circuit (for example, an FPGA or an ASIC) for performing a specific process.

In the following description, a "processor" includes one or more processors. At least one processor is typically a microprocessor such as a CPU (Central Processing Unit) and may be another type of processor such as a GPU (Graphics Processing Unit). At least one processor may be single cores and may be multi-cores.

Further, at least one processor may be a processor in a broad sense such as a hardware circuit (for example, FPGA (Field-Programmable Gate Array) or ASIC (Application Specific Integrated Circuit)) that performs a part or all of the processes.

A program may be installed in an apparatus such as a computer from a program source. The program source may be a program distribution server or a computer-readable recording medium, for example. When the program source is a program distribution server, the program distribution server includes a processor and a storage resource for storing the program to be distributed, and the processor of the program distribution server may distribute the program to be distributed to other computers. Moreover, in the following description, two or more programs may be implemented as one program, and one program may be implemented as two or more programs.

In the present disclosure, a storage apparatus and a storage device include one storage drive such as one HDD (Hard Disk Drive) and SSD (Solid State Drive), a RAID apparatus including a plurality of storage drives, and a plurality of RAID apparatuses. When the drive is an HDD, for example, a SAS (Serial Attached SCSI) HDD may be included, or an NL-SAS (near-line SAS) HDD may be included.

Further, the storage apparatus may be one or more memories, and typically may be a main storage device. At least one memory in the memory may be a volatile memory or a non-volatile memory.

FIG. 1 is a diagram illustrating a hardware configuration of a computer system according to an embodiment.

A computer system 1 according to the embodiment has a first computer system (a mainframe system) 10 and a second computer system (an open system) 40, and the first computer system 10 and the second computer system 40 are connected by a network 50.

The first computer system 10 has a first computer apparatus 100 and a first storage apparatus (for mainframe) 200, and the first computer apparatus 100 and the first storage system 200 are connected by a network 300.

The first computer apparatus 100 is an information processing apparatus such as a computer capable of performing various types of information processing. The first computer apparatus 100 includes a processor 110, a main storage apparatus 120, and an auxiliary storage apparatus 130.

A use state analysis program 122 and a data migration program 123 are stored in the main storage apparatus 120 as a data management program 121, which is a feature of the present embodiment.

The use state analysis program 122 analyzes the use state of a dataset (in the following description, in view of the fact that the first computer apparatus 100 may operate data in units of datasets in response to requests from users, data that is operated in units of requests from users is handled as a dataset) and stores the same in the dataset history table 131 when the first computer system 10 operates the dataset in response to a request from a user (not illustrated in the drawing).

The data migration program 123 determines and extracts a dataset that needs to be pre-migrated from the first computer system 10 to the second computer system 40, and the second computer system 40, migrates the dataset that needs to be pre-migrated after converting the same to the data format and character code for an open system which is the second computer system 40, and further, migrates a job step from the first computer system 10 to the second computer system 40.

The detailed operations of the use state analysis program 122 and the data migration program 123 will be described later.

Further, a plurality of jobs 125 is stored in the main storage apparatus 120 as a job execution base 124. Each job 125 has a job step 126. Here, the number of job steps 126 included in the job 125 is not particularly limited, and is not limited to two as illustrated in FIG. 1.

Further, a plurality of programs 127 is stored in the main storage apparatus 120. The number of programs 127 stored in the main storage apparatus 120 is not particularly limited, and is not limited to three as illustrated in FIG. 1.

The auxiliary storage apparatus 130 stores a dataset history table 131, a job step input/output information table 132, a dataset usage management table 133, and an individual dataset usage management table 134. Details of these tables 131 to 134 will be described later.

The first storage system 200 has a controller 210 and a storage unit 220. The controller 210 performs various operations on the datasets 221 stored in the storage unit 220 in response to a request from the first computer apparatus 100. The datasets 221 are stored in the storage unit 220. The number of datasets 221 stored in the storage unit 220 is not particularly limited, and is not limited to six as illustrated in FIG. 1.

The second computer system 40 has a second computer apparatus 400 and a second storage apparatus (for an open system) 500, and the second computer apparatus 400 and the second storage system 500 are connected to each other by the network 600.

The second computer apparatus 400 is also an information processing apparatus such as a computer capable of performing various types of information processing. The second computer apparatus 400 includes a processor 410, a main storage apparatus 420, and an auxiliary storage apparatus 430.

A plurality of jobs 422 is stored in the main storage apparatus 420 as a job execution base 421. Each job 422 has a job step 423. Further, a plurality of programs 424 is stored in the main storage apparatus 420.

The second storage system 500 has a controller 510 and a storage unit 520. The controller 510 performs various operations on the datasets 521 stored in the storage unit 520 in response to a request from the second computer apparatus 400. The datasets 521 are stored in the storage unit 520.

FIG. 2 is a diagram illustrating the dataset history table 131 of the computer system 1 according to the embodiment. The dataset history table 131 records the use state of the dataset 221 whenever the first computer apparatus 100 performs an opening or closing operation and an input/output operation on the dataset 221 stored in the storage unit 220 of the first storage system 200 on the basis of a request from a user. The dataset history table 131 is generated by the use state analysis program 122 of the first computer apparatus 100.

The dataset history table 131 has a dataset name 131a, a volume name 131b, a job name 131c, a step name 131d, a program name 131e, an input/output 131f, a DS state 131g, a data amount 131h, and a date and time 131i as entries.

The dataset name 131a is the name of the dataset 221 operated by the first computer apparatus 100. The volume name 131b is the volume name of the first storage system 200 related to the operated dataset 221. The job name 131c is the name of the job 125 related to the operated dataset 221. The step name 131d is the name of the job step 126 related to the operated dataset 221. The program name 131e is the name of the program 127 related to the operated dataset 221. The input/output 131f indicates whether the operated dataset 221 is input or output to the storage unit 220. The DS state 131g indicates the state of the operated dataset 221. Specifically, OLD means that the dataset 221 remains as it is, MOD means that the dataset 221 has been overwritten, RNW means that the dataset 221 has been recreated, and NEW means that the dataset 221 has been newly created. The data amount 131h indicates the data amount of the operated dataset 221. The date and time 131i is a time stamp when the dataset 221 is operated.

FIG. 3 is a diagram illustrating the job step input/output information table 132 of the computer system 1 according to the embodiment. The job step input/output information table 132 is a table for searching the dataset 221 accessed by the job step 126, and is generated by the data migration program 123 on the basis of the dataset history table 131 illustrated in FIG. 2.

The job step input/output information table 132 has a job name 132a, a step name 132b, a dataset name 132c, and a volume name 132d as entries. The job name 132a, the step name 132b, the dataset name 132c, and the volume name 132d have the same contents as the job name 131c, the step name 131d, the dataset name 131a, and the volume name 131b of the dataset history table 131, respectively, and the description thereof is omitted here.

FIG. 4 is a diagram illustrating the dataset usage management table 133 of the computer system 1 according to the embodiment. The dataset usage management table 133 is a table for managing the individual dataset usage management table 134, and is generated by the data migration program 123 on the basis of the dataset history table 131 illustrated in FIG. 2.

The dataset usage management table 133 has a dataset name 133a, a volume name 133b, and a reference to individual dataset usage management table 133c as entries. Since the contents of the dataset name 133a and the volume name 133b are the same as those of the dataset name 131a and the volume name 131b of the dataset history table 131, the description thereof is omitted here. The reference to individual dataset usage management table 133c is the name of the individual dataset usage management table 134 to be referred to for the dataset 221 specified by the dataset name 133a.

FIG. 5 is a diagram illustrating the individual dataset usage management table 134 of the computer system 1 according to the embodiment. The individual dataset usage management table 134 illustrated in FIG. 5 illustrates DATA3_VOL001_TABLE as an example. The individual dataset usage management table 134 is a table that stores the information of the job step 126 that has been input/output for each dataset 221 in the order of access. The individual dataset usage management table 134 is generated by the data migration program 123 on the basis of the dataset history table 131 illustrated in FIG. 2. In addition, the migration state of each job step 126 is also stored.

The individual dataset usage management table 134 has an access order 134a, a job name 134b, a step name 134c, an input/output 134d, a migration verification flag 134e, and a migration completion flag 134f as entries. The access order 134a is a number indicating the access order to the dataset 221 whose dataset name is DATA3 in the example illustrated in FIG. 5. Since the job name 134b and the step name 134c have the same contents as the job name 131c and the step name 131d in the dataset history table 131, the description thereof is omitted here. The migration verification flag 134e and the migration completion flag 134f are flags indicating the migration verification state and the migration completion state of the dataset 221 described later, respectively.

Next, the operation of the computer system 1 of the present embodiment will be described with reference to FIGS. 6 to 13.

Figure 6:
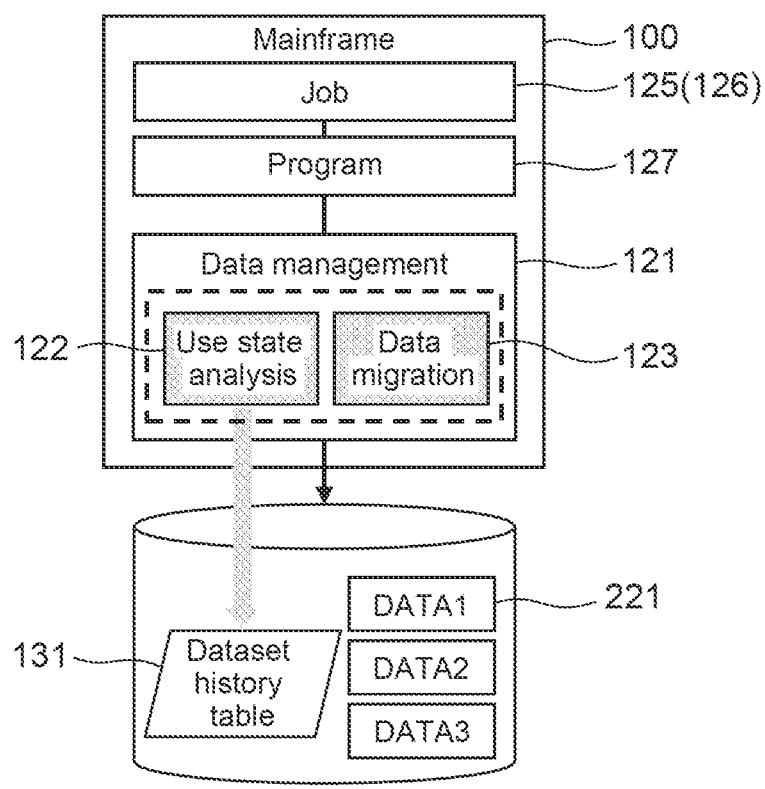
FIG. 6 is a diagram for explaining an outline of an investigation phase of the computer system according to the embodiment.

FIG. 6 is a diagram for explaining an outline of the investigation phase of the computer system 1 according to the embodiment.

In the investigation phase, in the first computer apparatus 100, the use state analysis program 122 traps information and adds the information to the dataset history table 131 whenever there is an input or an output from the user in a data management part that operates every time the dataset 221 is opened or closed and input or output by the user. Here, since some jobs 125 (including job steps 126) move only once a year, the use state analysis by the use state analysis program 122 is performed for one year or more, and the data is accumulated.

Figure 7:
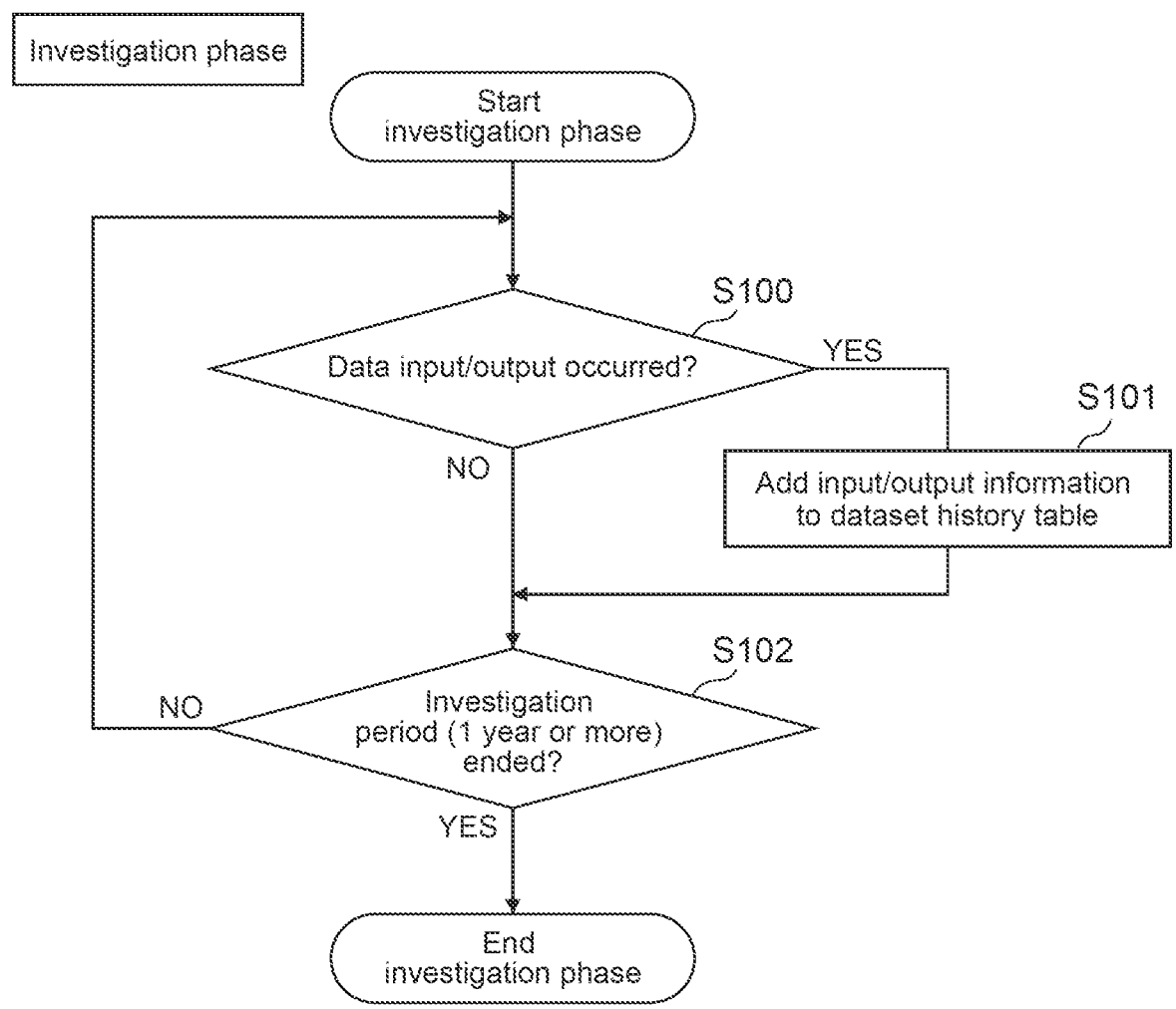
FIG. 7 is a flowchart for explaining an example of processing in the investigation phase of the computer system according to the embodiment.

FIG. 7 is a flowchart for explaining an example of processing in the investigation phase of the computer system 1 according to the embodiment.

First, the use state analysis program 122 determines whether data input/output has occurred (S100). Then, when it is determined that data input/output has occurred (YES in S100), the flow proceeds to S101, and when it is determined that data input/output has not occurred (NO in S100), the flow proceeds to S102.

In S101, the use state analysis program 122 adds input/output information to the dataset history table 131. After that, the flow proceeds to S102.

In S102, the use state analysis program 122 determines whether the investigation period (a preset period, preferably one year or more) has ended. Then, when it is determined that the process has not been completed (NO in S102), the flow returns to S100, and when it is determined that the process has been completed (YES in S102), the process illustrated in FIG. 7 ends.

Figure 8:
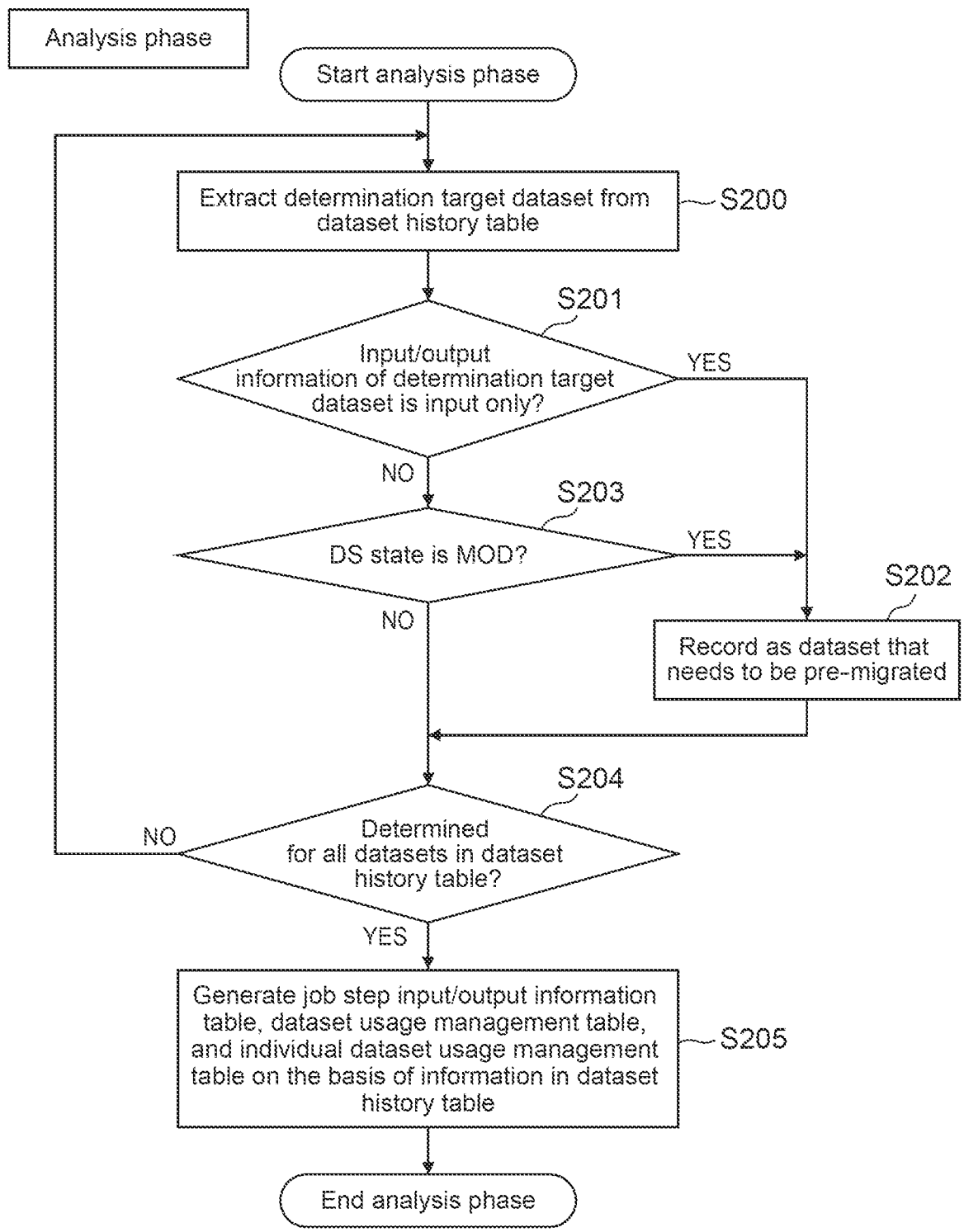
FIG. 8 is a flowchart for explaining an example of processing in an analysis phase of the computer system according to the embodiment.

FIG. 8 is a flowchart for explaining an example of processing in the analysis phase of the computer system 1 according to the embodiment.

The outline of the processing of the analysis phase performed in the flowchart of FIG. 8 will be described.

The data migration program 123 determines the dataset 221 that needs to be pre-migrated on the basis of the information in the dataset history table 131 generated by the use state analysis program 122 in the investigation phase. The conditions for pre-migration are as follows.

(a) Dataset 221 in which all inputs/outputs 131f are only input in the dataset history table 131.

(b) Dataset 221 in which MOD is specified as DS state 131g and which is additionally written.

A dataset 221 that satisfies both of the conditions (a) and (b) is defined as a dataset 221 that needs to be pre-migrated.

Subsequently, the data migration program 123 generates the job step input/output information table 132, the dataset usage management table 133, and the individual dataset usage management table 134 on the basis of the information in the dataset history table 131.

In FIG. 8, the data migration program 123 extracts a determination target dataset 221 from the dataset history table 131 (S200). Subsequently, the data migration program 123 determines whether the input/output 131f of the extracted determination target dataset 221 is only an input (S201). Then, when it is determined that there is only input (YES in S201), the flow proceeds to S202, and when it is determined that there is not only input (NO in S201), the flow proceeds to S203.

In S203, the data migration program 123 determines whether the DS state 131g of the extracted determination target dataset 221 is MOD. Then, when it is determined that it is MOD (YES in S203), the flow proceeds to S202, and when it is determined that it is not MOD (NO in S203), the flow proceeds to S204.

In S202, the data migration program 123 records that the extracted determination target dataset 221 is the dataset 221 that needs to be pre-migrated. After that, the flow proceeds to S204.

In S204, the data migration program 123 determines whether all the datasets 221 in the dataset history table 131 have been determined. Then, when it is determined that all the datasets have been determined (YES in S204), the flow proceeds to S205, and when it is determined that there is a dataset 221 that has not yet been determined, the flow returns to S200 and the determination operation is repeated.

In S205, the data migration program 123 generates the job step input/output information table 132, the dataset usage management table 133, and the individual dataset usage management table 134 on the basis of the information in the dataset history table 131.

Figure 9:
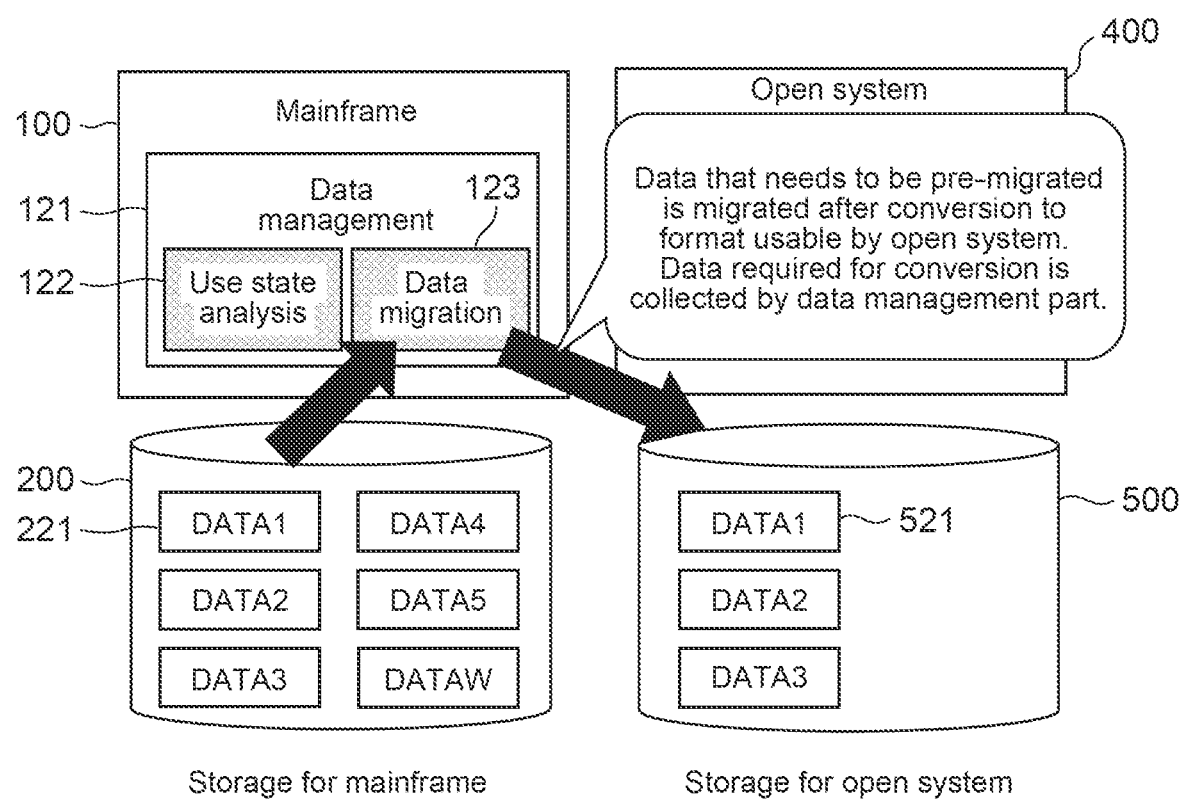
FIG. 9 is a diagram for explaining an outline of pre-migration of data of the computer system according to the embodiment.
Figure 10:
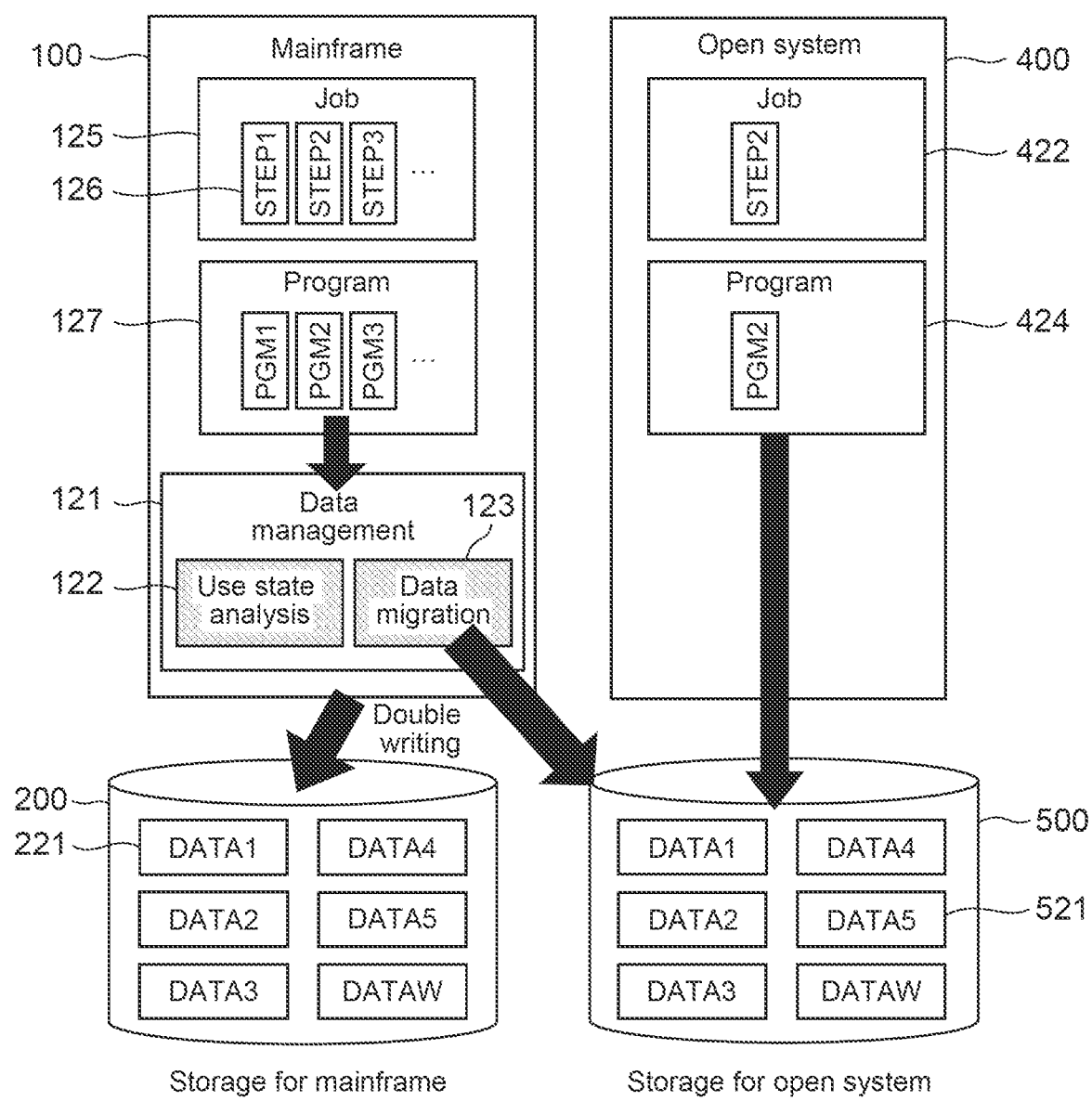
FIG. 10 is a diagram for explaining an outline of data migration in a migration phase of the computer system according to the embodiment.
Figure 11:
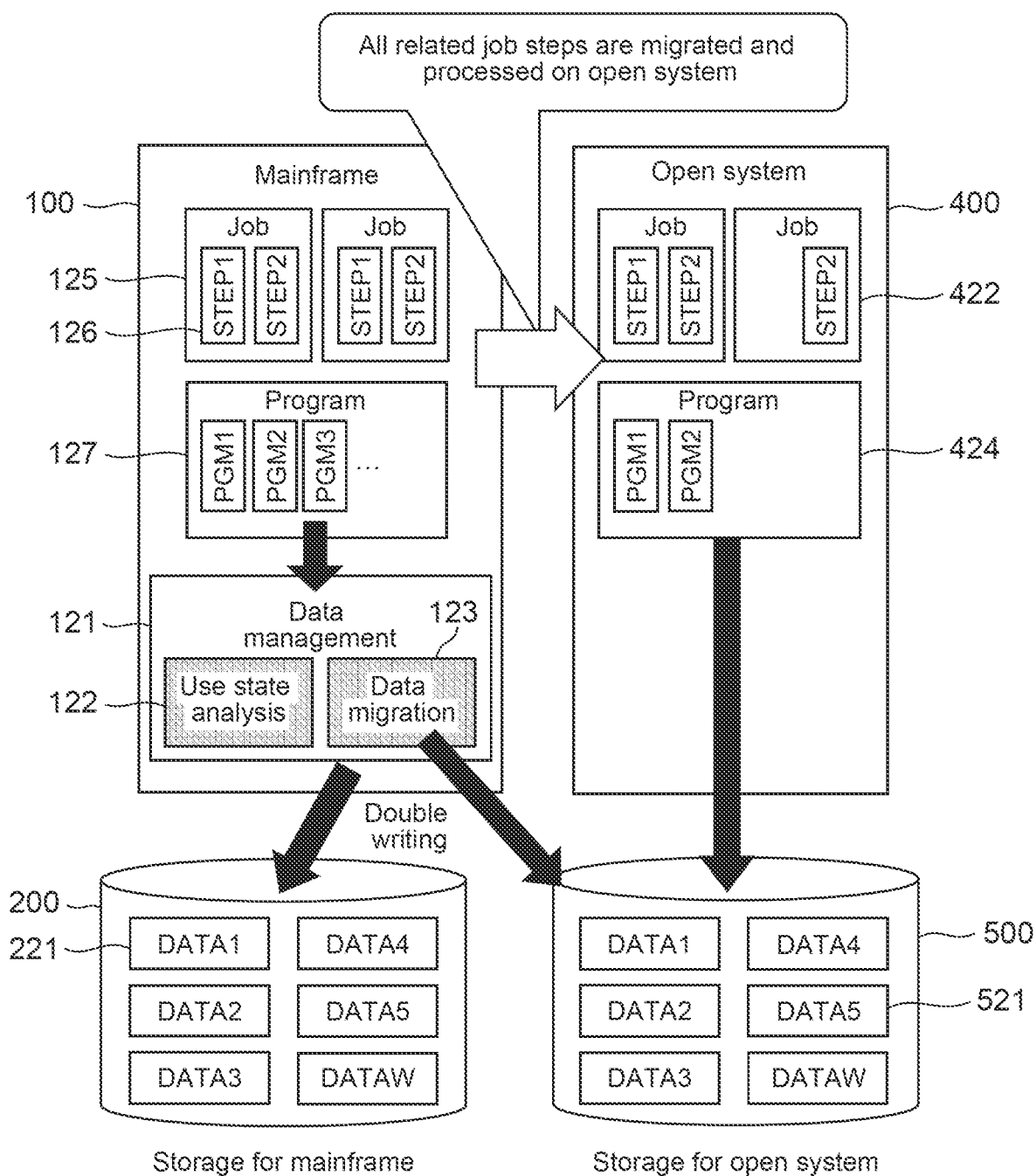
FIG. 11 is a diagram for explaining an outline of migration of job steps of the computer system according to the embodiment.

FIG. 9 is a diagram for explaining an outline of data migration of the computer system 1 according to the embodiment, FIG. 10 is a diagram for explaining an outline of data migration in the migration phase of the computer system 1 according to the embodiment, and FIG. 11 is a diagram for explaining an outline of migration of job steps of the computer system 1 according to the embodiment.

In FIG. 9, the data migration program 123 migrates the dataset 221 that needs to be pre-migrated, determined in the analysis phase. In the data management part, information on the data structure such as fixed-length records and variable-length records can be acquired. On the basis of that information, the data migration program 123 converts it into a data format for an open system. Character code is also converted for open system.

In FIG. 10, the data migration program 123 performs double writing in which all the datasets 221 output from the first computer apparatus 100 are output to both the first storage system 200 and the second storage system 500. The dataset 221 output to the second storage system 500 is converted to the data for the open system as in the pre-migration. On the other hand, the data output in the job step after migration to the second computer system 40 is only output to the second storage system 500, and double writing is not performed.

In FIG. 11, the migration of the job step 126 is performed on the basis of a technique of automatically and sequentially migrating the processing of the job step 126 to the second computer apparatus 400 (for example, a technique disclosed in Patent Literature 1) in order from the job step 126 corresponding to the program 127 for which the porting to the second computer apparatus 400 and the verification have been completed.

The data migration program 123 applies the migration determination flow illustrated in FIG. 13 to be described later with respect to the migration of the job step 126, determines the dependency of the migration with other job steps 126, and migrates the processing of the target job step 126 to the second computer apparatus 400 only when it is determined that migration is possible. When it is determined that migration is not possible, migration is suspended and migration is performed when the job step 126 having dependency is migrated.

As a result, the job 125 and the program 127 of the first computer apparatus 100 can be migrated to the second computer system 40 together with the dataset 222 in a non-stopping manner.

Figure 12:
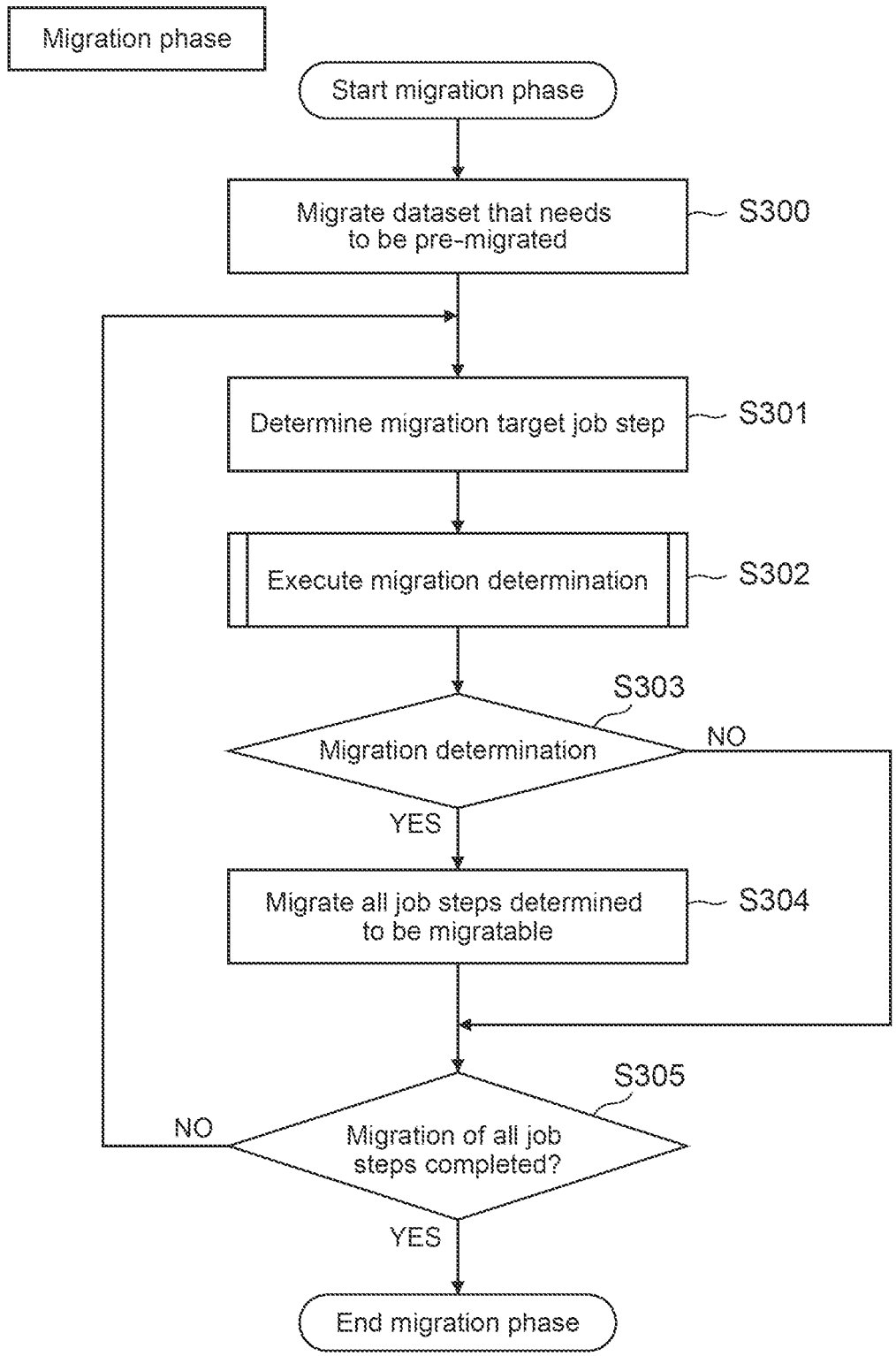
FIG. 12 is a flowchart for explaining an example of processing in a migration phase of the computer system according to the embodiment.

FIG. 12 is a flowchart for explaining an example of processing in the migration phase of the computer system 1 according to the embodiment.

First, the data migration program 123 migrates the dataset 221 that needs to be pre-migration, determined in the analysis phase (S300). Subsequently, the data migration program 123 determines the migration target job step 126 on the basis of, for example, the technique disclosed in Patent Literature 1 (S301).

Subsequently, the data migration program 123 determines whether the job step 126 can be migrated (S302). The details of the migration determination process will be described later. Further, the data migration program 123 determines whether the target job step 126 in the process of S302 is determined to be migratable (S303). Then, when the determination is affirmed (YES in S303), the flow proceeds to S304, and when the determination is negative (NO in S303), the flow proceeds to S305.

In S304, the data migration program 123 migrates all the job steps 126 determined to be migratable.

Then, in S305, it is determined whether the data migration program 123 has completed the migration of all the job steps 126. As a result, when it is determined that the migration of all job steps 126 has been completed (YES in S305), the process illustrated in FIG. 12 is completed, and when it is determined that there is a job step 126 that has not been migrated (NO in S305), the flow returns to S301 and the process continues.

Figure 13:
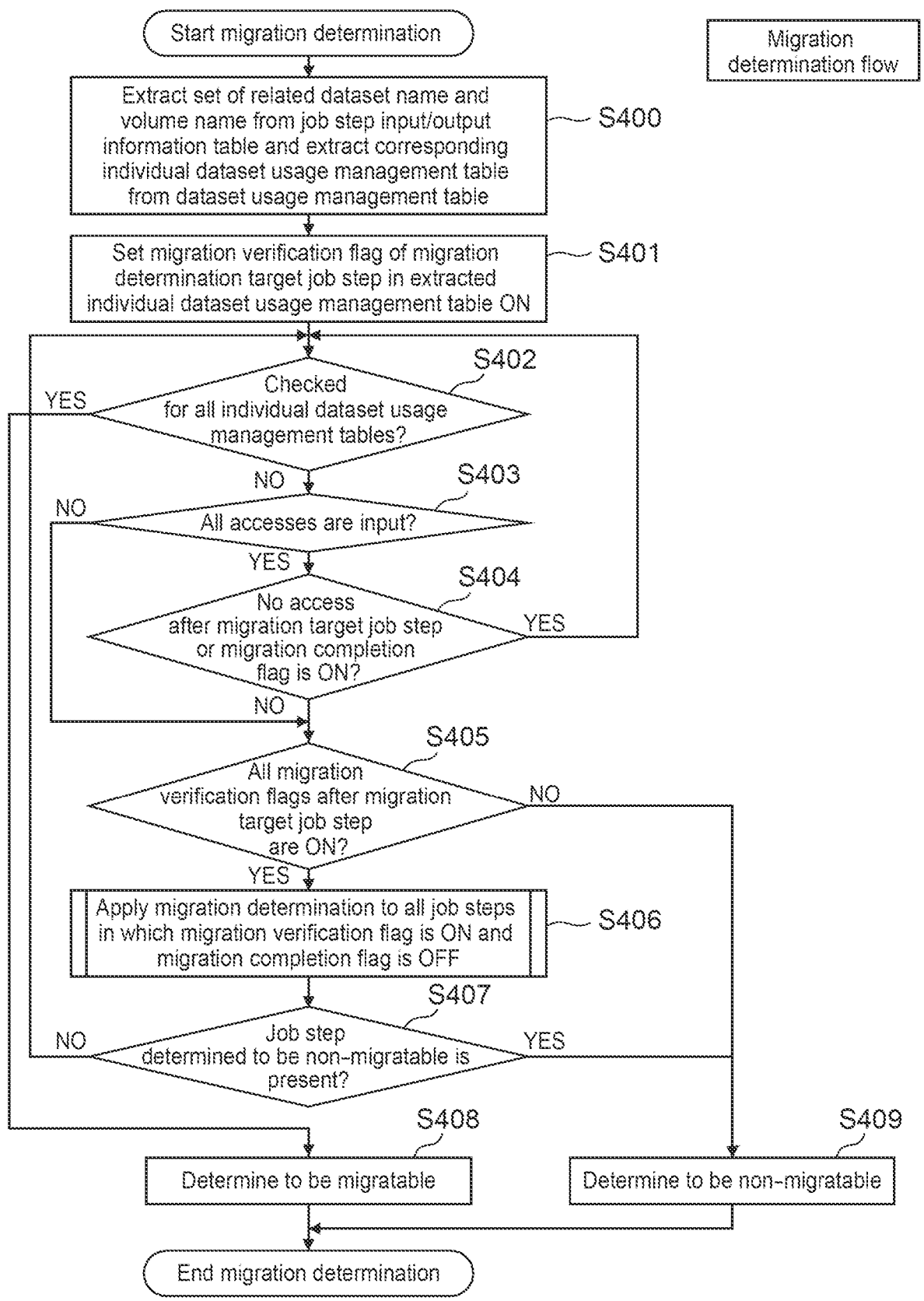
FIG. 13 is a flowchart for explaining an example of a migration determination process of the computer system according to the embodiment.

FIG. 13 is a flowchart for explaining an example of the migration determination process of the computer system 1 according to the embodiment.

Prior to explanation of the processing of the flowchart illustrated in FIG. 13, the outline of the migration determination processing will be described.

(1) The data migration program 123 extracts a set of related dataset name 132c and volume name 132d from the job step input/output information table 132 for the migration determination target job step 126, and extracts the corresponding individual dataset usage management table 134 from the dataset usage management table 133.

(2) For all the individual dataset usage management tables 134 extracted in (1), the migration verification flag 134e of the migration determination target job step 126 is set to ON.

(3) It is ascertained whether the migration condition or the migration verification condition is satisfied for the individual dataset usage management table 134 extracted in (1). When neither is satisfied, the determination ends as non-migratable.

Here, it is assumed that the migration condition satisfies the following condition c or d.
c. All inputs/outputs 134d to the dataset 221 are inputs.
d. There is no data access after the migration target job step 126, or the migration completion flag 134f is ON.

In addition, it is assumed that the migration verification condition satisfies the following conditions e and f.
e. The migration condition is not satisfied.
f. All migration verification flags 134e are ON after the access order of the migration target job step 126.

(4) When the migration verification condition is satisfied, the migration determination flow is applied to all job steps 126 in which the migration verification flag 134e is ON and the migration completion flag 134f is OFF. When there is a job step 126 whose determination has ended as non-migratable, the job step 126 subject to migration determination ends the determination as non-migratable.

(5) The processes of (3) and (4) are executed for all the individual dataset usage management tables extracted in (1).

(6) It is determined that the migration target job step 126 and all the job steps 126 to which the migration determination flow is applied in the process of (4) can be migrated. In all the individual dataset usage management tables 134, the migration completion flag 134f of the job step 126 determined to be migratable is set to ON.

In FIG. 13, the data migration program 123 extracts a set of related dataset name 132c and volume name 132d from the job step input/output information table 132, and extracts the corresponding individual dataset usage management table 134 from the dataset usage management table 133 (S400).

Subsequently, the data migration program 123 set the migration verification flag 134e of the migration determination target job step 126 in the extracted individual dataset usage management table 134 to ON (S401).

Subsequently, the data migration program 123 determines whether all the individual dataset usage management tables 134 have been checked (S402). Then, when it is determined that all the individual dataset usage management tables 134 has been checked (YES in S402), the flow proceeds to S408, and when it is determined that all the individual dataset usage management tables 134 have not been checked (NO in S402), the flow proceeds to S403.

In S403, the data migration program 123 determines whether all the inputs/outputs 134d to the dataset 221 are inputs in the individual dataset usage management table 134 extracted in S400. Then, when it is determined that all the inputs/outputs 134d to the dataset 221 are inputs (YES in S403), the flow proceeds to S404, and when it is determined that even one of the inputs/outputs 134d to the dataset 221 is an output (NO in S403), the flow proceeds to S405.

In S404, the data migration program 123 determines whether there is no data access after the migration target job step 126, or whether the migration completion flag 134f is ON. Then, when the determination is affirmed (YES in S404), the flow returns to S402 by determining that the migration condition is satisfied, and when the determination is negative (NO in S404), the flow proceeds to S405 by determining that the migration condition is not satisfied.

In S405, the data migration program 123 determines whether all the migration verification flags 134e are ON after the access order of the migration target job step 126. Then, when the determination is affirmed (YES in S405), the flow proceeds to S406 by determining that the migration verification condition is satisfied, and when the determination is negative (NO in S405), the flow proceeds to S409 by determining that neither the migration condition or the migration determination condition is satisfied.

In S406, the data migration program 123 applies the migration determination illustrated in FIG. 13 to all job steps 126 in which the migration verification flag 134e is ON and the migration completion flag 134f is OFF.

Then, the data migration program 123 determines whether there is a job step 126 that has been determined to be non-migratable (S407). Then, when it is determined that there is a job step 126 determined to be non-migratable (YES in S407), the flow proceeds to S409, and when it is determined that there is no job step 126 determined to be non-migratable (NO in S407), the flow returns to S402.

In S408, the data migration program 123 determines that the target job step 126 is migratable. In S409, the data migration program 123 determines that the target job step 126 is not migratable.

According to the present embodiment configured as described above, it is possible to realize a computer apparatus, a computer system, and a data migration method capable of automating data migration required for migration.

Further, by double-writing the data output of the first computer apparatus 100, which is the mainframe, to the first storage system 200 and the second storage system 500, the data can be migrated without any special operation for migration.

Furthermore, it is possible to determine whether the data needs to be migrated just by executing the conventional operation.

Further, in order to determine whether the migration of job step 126 is possible in consideration of the dependency due to data input/output, the migration including the data migration can be performed automatically and in a non-stopping manner.

Since unnecessary data is not migrated, the amount of data after migration can be reduced.

For example, the embodiments described above have been described in detail for easy understanding of the present invention. The present invention is not necessarily limited to the embodiment that is provided with all of the configurations described. In addition, a part of each configuration of the embodiment may be removed, substituted, or added to other configurations.

A part or the entirety of each of the above configurations, functions, processing units, processing means, and the like may be realized by hardware, such as by designing integrated circuits thereof. In addition, the present invention can be realized by program codes of software that realizes the functions of the embodiment. In this case, a storage medium on which the program codes are recorded is provided to a computer, and a processor included in the computer reads the program codes stored on the storage medium. In this case, the program codes read from the storage medium realize the functions of the above embodiment, and the program codes and the storage medium storing the program codes constitute the present invention. Examples of such a storage medium used for supplying such program codes include a flexible disk, a CD-ROM, a DVD-ROM, a hard disk, a SSD (Solid State Drive), an optical disc, a magneto-optical disc, a CD-R, a magnetic tape, a non-volatile memory card, and a ROM.

The program codes that realize the functions written in the present embodiment can be implemented by a wide range of programming and scripting languages such as assembler, C/C++, perl, Shell, PHP, and Java (registered trademark).

In the above embodiment, only control lines and information lines which are considered to be necessary for explanation are illustrated, and it cannot be said that all control lines and information lines are not always necessary to manufacture a product. All of the configurations of the embodiment may be connected to each other.

What is claimed is:

1. A computer apparatus that migrates operations having programs and data from a computer system having the computer apparatus and a storage apparatus to a migration destination computer system which has a system environment different from that of the computer system and has a migration destination computer apparatus and a migration destination storage apparatus, the computer apparatus comprising:
a use state analysis unit configured to acquire a use history of the data in the computer system and the program using the data; and
a data migration unit configured to extract the data that is able to be migrated from the computer system to the migration destination computer system on the basis of the use history, write the migratable data to the storage apparatus and the migration destination storage apparatus, and migrate the program to the migration destination computer system on the basis of the use history of the data used by the program.

2. The computer apparatus according to claim 1, wherein the use state analysis unit acquires the use history of a job of the program and a job step of the job, and
the data migration unit migrates the job step to the migration destination computer system on the basis of the use history of the data used by the job step.

3. The computer apparatus according to claim 1, wherein when writing the migratable data to the migration destination storage apparatus, the data migration unit writes the data after converting the same to a state where the data can be used in the migration destination computer system.

4. The computer apparatus according to claim 1, wherein the data migration unit extracts the data that is able to be migrated from the computer system to the migration destination computer system on the basis of an input/output history of the data to the storage apparatus and a write history of the data to the storage apparatus.

5. The computer apparatus according to claim 2, wherein the data migration unit migrates the job step to the migration destination computer system after migrating the program from the computer system to the migration destination computer system.

6. The computer apparatus according to claim 2, wherein the data migration unit acquires a use order of the job step that uses the data, and when a specific job step that uses the same data after the job step is determined to be non-migratable to the migration destination computer system, determines that migration of the specific job step to the migration destination computer system is not possible.

7. A computer system comprising:
a first computer system which is a migration source of operations having programs and data and includes a first computer apparatus and a first storage apparatus; and
a second computer system which is a migration destination of the operations, has a system environment different from that of the first computer system, and includes a second computer apparatus and a second storage apparatus, wherein
the first computer apparatus includes:
a use state analysis unit configured to acquire a use history of the data in the computer system and the program using the data; and
a data migration unit configured to extract the data that is able to be migrated from the first computer system to the second computer system on the basis of the use history, write the migratable data to the first storage apparatus and the second storage apparatus, and migrate the program to the second computer system on the basis of the use history of the data used by the program.

8. A data migration method by a computer apparatus that migrates operations having programs and data from a computer system having the computer apparatus and a storage apparatus to a migration destination computer system which has a system environment different from that of the computer system and has a migration destination computer apparatus and a migration destination storage apparatus, the data migration method comprising:
acquiring a use history of the data in the computer system and the program using the data; and
extracting the data that can is able to migrated from the computer system to the migration destination computer system on the basis of the use history, writing the migratable data to the storage apparatus and the migration destination storage apparatus, and migrating the program to the migration destination computer system on the basis of the use history of the data used by the program.

\* \* \* \* \*